(12) United States Patent
Ilan et al.

(10) Patent No.: US 8,543,854 B1
(45) Date of Patent: Sep. 24, 2013

(54) METHOD AND SYSTEM FOR POWER CONFIGURATION

(75) Inventors: Dan Ilan, Herzellia (IL); Rabeeh Khoury, Tarshiha (IL); Tawfik Bayouk, Meilya Village (IL)

(73) Assignee: Marvell Israel (M.I.S.L) Ltd., Yokneam (IL)

(*) Notice: Subject to any disclaimer, the term of this patent is extended or adjusted under 35 U.S.C. 154(b) by 230 days.

(21) Appl. No.: 12/965,388

(22) Filed: Dec. 10, 2010

Related U.S. Application Data

(60) Provisional application No. 61/290,723, filed on Dec. 29, 2009.

(51) Int. Cl.
  *G06F 1/00* (2006.01)
  *G06F 1/26* (2006.01)
  *G06F 1/32* (2006.01)

(52) U.S. Cl.
  USPC ............................ 713/323; 713/300; 713/320

(58) Field of Classification Search
  USPC .................................................. 713/300, 323
  See application file for complete search history.

(56) References Cited

U.S. PATENT DOCUMENTS

| | | | |
|---|---|---|---|
| 6,609,182 B1* | 8/2003 | Pedrizetti et al. | 711/159 |
| 2007/0234028 A1* | 10/2007 | Rothman et al. | 713/1 |
| 2009/0150689 A1* | 6/2009 | Simeral et al. | 713/300 |
| 2009/0217072 A1* | 8/2009 | Gebhart et al. | 713/330 |

* cited by examiner

*Primary Examiner* — Kim Huynh
*Assistant Examiner* — Brandon Kinsey

(57) ABSTRACT

Aspects of the disclosure provide a method for power mode switching. The method includes sending a pausing request to an application executed in an electronic system. The pausing request informs the application of an intent to switch the electronic system from an active mode to a power saving mode that causes the electronic system to pause executing the application. Then, the method includes determining that the application accepts the pausing request, and configuring the electronic system into the power saving mode, such that the application pauses at a pausing point determined in response to the pausing request.

20 Claims, 3 Drawing Sheets

METHOD AND SYSTEM FOR POWER CONFIGURATION

INCORPORATION BY REFERENCE

This application claims the benefit of U.S. Provisional Application No. 61/290,723, "Method for Entering a System into Screen Refresh Low Power State" filed on Dec. 29, 2009, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Generally, a battery powered electronic device has multiple power modes, such as an active mode, a power saving mode, and the like. In the active mode, the battery powered electronic device is active and ready to conduct any suitable operations, and consumes a relatively large amount of power. In the power saving mode, in an example, the battery powered electronic device powers off portions of its hardware to reduce power consumption. Thus, the battery powered electronic device performs limited operations, and consumes a relatively low amount of power in the power saving mode.

SUMMARY

Aspects of the disclosure provide a method for power mode switching. The method includes sending a pausing request to an application executed in an electronic system. The pausing request informs the application of an intent to switch the electronic system from an active mode to a power saving mode that causes the electronic system to pause executing the application. The method further includes determining that the application accepts the pausing request, and configuring the electronic system into the power saving mode, such that the application pauses at a pausing point determined in response to the pausing request.

In an embodiment, the method includes receiving an idle trigger for switching to the power saving mode when an idle time of the electronic system is longer than a threshold, and sending the pausing request in response to the idle trigger. In an example, the method includes receiving an input idle trigger when an input idle time is longer than an input idle threshold. In another example, the method includes receiving a central processing unit (CPU) idle trigger when a CPU idle time is longer than a CPU idle threshold.

In another embodiment, the method includes receiving a user trigger for switching to the power saving mode in response to a user request, and sending the pausing request in response to the user trigger.

According to an aspect of the disclosure, when the application accepts the pausing request, the application sends a pausing accepted signal. Then, the method includes receiving the pausing accepted signal from the application that indicates the application accepts the pausing request. According to another aspect of the disclosure, when the application denies the pausing request, the application sends a pausing denied signal. Then, the method includes not receiving the pausing denied signal from the application that indicates the application denies the pausing request.

Further, to configure the electronic system into the power saving mode, the method includes transmitting a switch signal to a power management unit that configures the electronic system into the power saving mode.

In addition, the method includes receiving an interrupt from an input device when the electronic system is in the power saving mode, switching the electronic system to the active mode, and sending a resuming request to the application to resume execution from the pausing point.

Aspects of the disclosure provide an electronic system. The electronic system includes hardware components configured to execute an application in an active mode and pause the execution in a power saving mode. Further, the electronic system includes a power mode aware application configured to receive a pausing request that informs an intent to change to the power saving mode, accept or deny the pausing request, and determine a pausing point and prepare to pause at the pausing point when the pausing request is accepted. The electronic system also includes a power management module configured to send the pausing request to the power mode aware application during an execution of the power mode aware application, determine that the power mode aware application accepts the pausing request, and configure the hardware components to the power saving mode when the power mode aware application accepts the pausing request.

In an embodiment, the power management module includes an idle profiler configured to generate a first idle trigger to trigger the pausing request when an input idle time is longer than an input idle threshold, and generate a second idle trigger to trigger the pausing request when a central processing unit (CPU) idle time is longer than a CPU idle threshold.

In another embodiment, the electronic system includes a user power mode switch program configured to trigger the pausing request in response to a user request.

According to an aspect of the disclosure, the power mode aware application is configured to send a pausing accepted signal to the power management module when the pausing request is accepted. In an embodiment, sending the pausing accepted signal implies that the power aware application has performed necessary operations to reach a secure pause point and is ready to enter the power saving mode. According to another aspect of the disclosure, the power mode aware application is configured to send a pausing denied signal to the power management module when the pausing request is denied.

In an embodiment, the hardware components include a power management unit configured to switch the hardware components into the active mode or the power saving mode based on a switch signal from the power management module.

Further, the power management module is configured to receive an interrupt from an input device when the hardware components are in the power saving mode, switch the hardware components into the active mode, and send a resuming request to the power mode aware application to resume execution from the pausing point.

Aspects of the disclosure provide a computer readable medium storing program instructions of the power mode aware application. The program instructions are executed by a processor to perform the power mode aware application.

Aspects of the disclosure also provide a computer readable medium storing program instructions of the power management module. The program instructions are executed by a processor to perform the power management operations.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
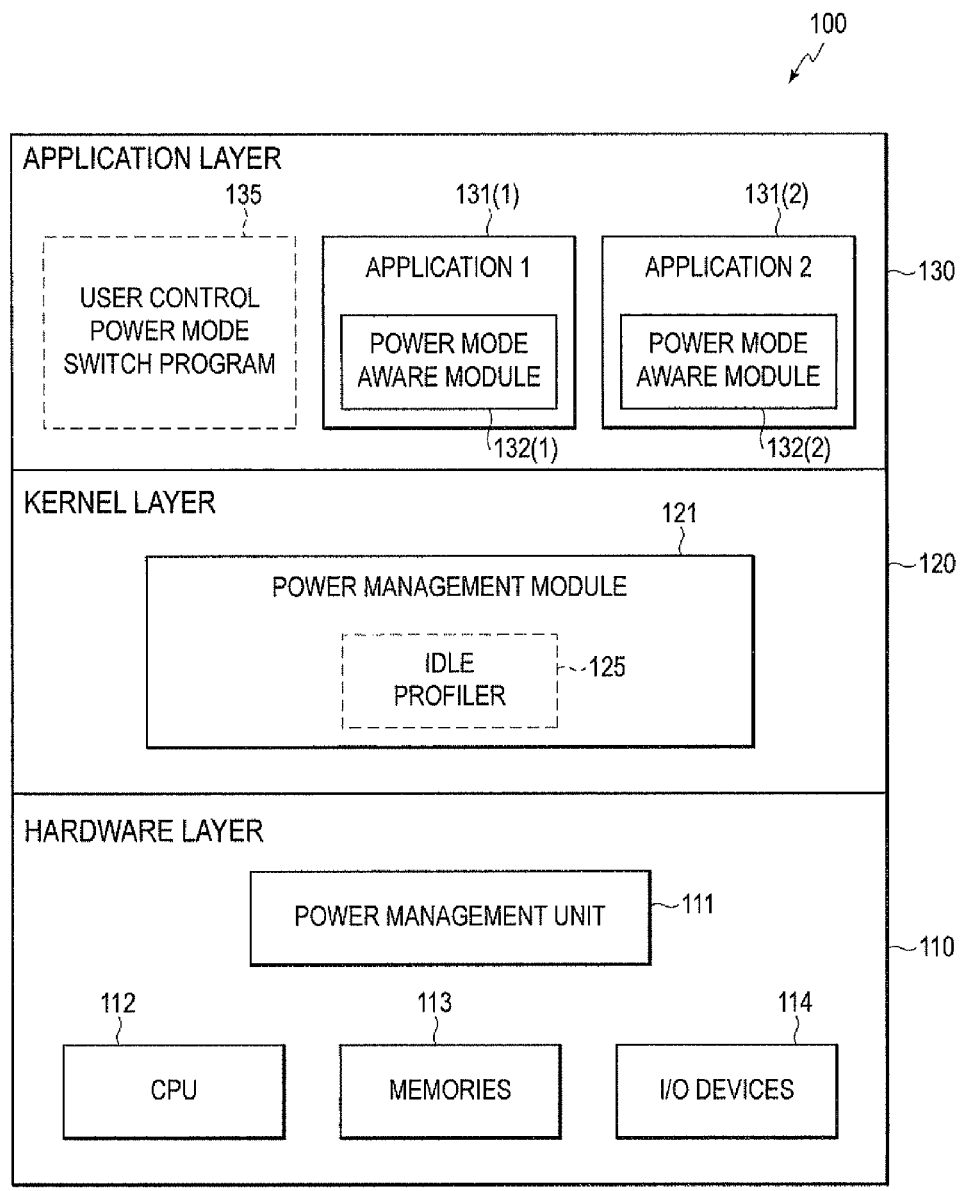
FIG. 1 shows a block diagram of an electronic system example according to an embodiment of the disclosure.

FIG. 1 shows a block diagram of an electronic system example 100 according to an embodiment of the disclosure. The electronic system 100 includes hardware and software that are suitably integrated to perform desired functions. Generally, the hardware and the software are structured into layers, e.g., to facilitate design. For example, the electronic system 100 includes a hardware layer 110, a kernel layer 120, and an application layer 130 from bottom-up. The hardware layer 110 includes hardware resources of the electronic system 100. The kernel layer 120 bridges between the hardware layer 110 and the application layer 130. In an example, the kernel layer 120 includes system codes for managing the hardware resources. The application layer 130 includes application codes that are designed for specific tasks. The application codes in the application layer 130 call the system codes in the kernel layer 120 to use hardware resources in the hardware layer 110.

According to an embodiment of the disclosure, the hardware layer 110 has multiple power modes. The application layer 130 includes applications that are aware the power modes of the hardware layer 110. The kernel layer 120 communicates with the power mode aware applications to determine whether it is appropriate to switch the power mode of the hardware layer 110, and to cause the power mode aware applications to suitably adjust their executions in response to the power mode switch.

The electronic system 100 corresponds to any suitable electronic system, such as a laptop computer, a desktop computer, a handheld device, and the like. In an embodiment, the electronic system 100 is a battery powered electronic system. In another embodiment, a portion of the electronic system 100 is battery powered. The battery-powered portion is coupled with another portion of the electronic system 100 via a wired or wireless link.

The hardware layer 110 includes various hardware components. In an example, the hardware layer 110 includes a central processing unit (CPU) 112, memories 113, such as static random access memory (SRAM) (not shown), dynamic random access memory (DRAM) (not shown), and the like, and input/output (I/O) devices 114, such as a keypad (not shown), a display panel (not shown), and the like. The CPU 112 executes system and application codes. The memories 113 store the system and application codes. The input devices in the I/O devices 114 suitably receive user instructions, and the output devices in the I/O devices 114 generate outputs for the user, such as video output, audio output, and the like.

In addition, in an example, the hardware layer 110 includes a power management unit 111 that suitably configures the hardware components according to different power modes.

In an embodiment, the hardware layer 110 is configured to operate in an active mode and an e-book mode. In the active mode, for example, the hardware components, such as the CPU 112, the memories 113, and the I/O devices 114, and the like are fully powered up. Thus, the hardware layer 110 is active and ready to perform any suitable functions, such as movie playing, web browsing, and the like. In the e-book mode, the CPU 112 is powered off, and the display panel displays a static image. Thus, in the e-book mode, the hardware layer 110 has reduced power consumption compared to the active mode.

The power management unit 111 uses any suitable techniques to configure the hardware components to operate in different power modes. In an example, the hardware layer 110 includes a switchable power grid that provides power to the CPU 112. In the active mode, the power management unit 111 enables the power grid to power up the CPU 112. In the e-book mode, the power management unit 111 disables the power grid to power off the CPU 112.

In another example, the hardware layer 110 includes a DRAM having a self-refresh-mode (SRM). The DRAM enters the SRM to reduce power consumption when an idle time of the DRAM is longer than a threshold. In the e-book mode, the power management unit 111 suitably configures the hardware components to reduce memory access to the DRAM, and to increase the idle time of the DRAM. Thus, the DRAM enters the SRM and consumes less power in the e-book mode.

The kernel layer 120 includes a power management module 121. In an example, the power management module 121 includes system codes for managing the power mode of the hardware layer 110. For example, the power management module 121 monitors status of the hardware layer 110, communicates with the application layer 130 to determine suitable power mode for the hardware layer 110, and signals the power management unit 111 to configure the hardware layer 110 into the determined power mode.

In an embodiment, the power management module 121 includes an idle profiler 125 that profiles idle time for the hardware components in the hardware layer 110. In an example, the idle profiler 125 tracks an input idle time during which the input devices are continuously idle. In another example, the idle profiler 125 tracks a CPU idle time during which the CPU 112 is continuously idle. Then, the idle profiler 125 signals the power management module 121 when the input idle time is longer than an input idle threshold or when the CPU idle time is longer than a CPU idle threshold, for example.

Further, the power management module 121 sends signals to the application layer 130, and receives signals from the application layer 130. In an example, the power management module 121 sends pausing request signals to the application layer 130 to request relevant applications to pause execution, such that the hardware layer 110 can be configured into the e-book mode, for example. Further, the power management module 121 sends resuming signals to the application layer 130 to resume the execution of the paused applications. Also, the power management module 121 receives information from the application layer 130. For example, the power management module 121 receives a pausing denied signal, a pausing accepted signal, and the like, from the application layer 130. The pausing denied signal indicates that an application denies the pausing request. The pausing accepted signal indicates that an application has accepted the pausing request, prepared for pausing execution, and is ready for powering off the CPU 112, for example.

The power management module 121 determines suitable power mode for the hardware layer 110 according to the status of the hardware layer 110 and the application layer 130. In an example, the power management module 121 determines to switch the hardware layer 110 into the e-book mode when the CPU 112 has been idle for a relatively long time, e.g., a time that is longer than a threshold. In another example, the power management module 121 determines to switch the hardware layer 110 into the e-book mode when the input devices have been idle for a relatively long time, e.g., a time that is longer than a threshold, and all the relevant applications accept the pausing request. In another example, the power management module 121 determines to switch the hardware layer 110 into the e-book mode when a user pausing instruction is received, and all the relevant applications accept the pausing request.

The power management module 121 signals the power management unit 111 to configure the hardware layer 110 into the determined power mode. In an example, the power management module 121 includes suitable interrupts that signal the power management unit 111 to disable the power grid in order to power off the CPU 112, to reduce memory access to the DRAM, and the like.

The application layer 130 seen in FIG. 1 includes power mode aware applications 131 (1-2). In an example, the application 131(1) is a web browser 131(1) having a power mode aware module 132(1), and the application 131(2) is a video player 131(2) having a power mode aware module 132(2). In an embodiment, the power mode aware modules 132(1-2) are implemented as application specific modules that are coded based on the respective applications and are integrated with the respective applications. In another embodiment, the power mode aware modules 132(1-2) are implemented as general plug-in modules that can be suitably plugged in applications. It is noted that the web browser 131(1) and the video player 131(2) are merely examples. The application layer 130 can include additional power mode aware applications or different power mode aware applications.

Further, in an example, the application layer 130 includes a user control power mode switch program 135. The user control power mode switch program 135 generates a trigger signal to trigger the power management module 121 when a user gives a user instruction to switch the power mode. For example, when a user wants to take a break, the user gives a user instruction to switch the electronic system 100 to a power saving mode. The user control power mode switch program 135 then generates and sends a trigger signal to the power management module 121.

The power mode aware modules 132(1-2) handle pausing requests from the kernel layer 120. The power mode aware modules 132(1-2) can handle the pausing requests differently based on the triggers of the pausing requests and the respective applications. Further, the power mode aware modules 132(1-2) send signals back to the kernel layer 120 to inform the status for handling the pausing requests.

In an example, the kernel layer 120 generates a pausing request triggered by a user instruction, and sends pausing request signals respectively to the web browser 131(1) and the video player 131(2). The web browser 131(1) and the video player 131(2) then determine suitable pausing points and prepare for pausing at the suitable pausing points.

Specifically, when the power mode aware module 132(1) receives the pausing request signal, the power mode aware module 132(1) determines a suitable point to pause. In an embodiment, the web browser 131(1) includes static contents, such as static texts, pictures, and the like, and dynamic contents, such as animation, video clip, interactive interface, and the like. It is noted that the dynamic contents may change dynamically and the changes of the dynamic contents require processing resources, such as the CPU 112. The power mode aware module 132(1) determines whether pausing the dynamic contents is allowable. When pausing is allowable, the power mode aware module 132(1) further determines suitable points for the dynamic contents to pause at. In an example, the web browser 131(1) shows a flash commercial. The power mode aware module 132(1) determines that pausing the flash commercial is allowable. Then, the power mode aware module 132(1) determines an image for the flash commercial to pause at. Then, the power mode aware module 132(1) operates with other suitable modules of the web browser 131(1) to prepare for pausing at the determined point. Further, the power mode aware module 132(1) sends back a pausing accepted signal to inform the power management module 121 that the web browser 131(1) is ready for powering off the CPU 112.

Similarly, the power mode aware module 132(2) determines a video frame for the video player 131(2) to pause at. Then, the power mode aware module 132(2) operates with other suitable modules of the video player 131(2) to prepare for pausing at the determined video frame. Further, the power mode aware module 132(2) sends back a pausing accepted signal to inform the power management module 121 that the video player 131(2) is ready for powering off the CPU 112.

In another example, the kernel layer 120 generates a pausing request triggered by a relatively long idle time of the input devices, and sends pausing request signals respectively to the web browser 131(1) and the video player 131(2). The web browser 131(1) and the video player 131(2) operate differently in response to the pausing request signals.

Specifically, the power mode aware module 132(1) determines that pausing the web browser 131(1) is allowable, and then the power mode aware module 132(1) determines a suitable point to pause. For example, the power mode aware module 132(1) determines an image for the flash commercial to pause at. Then, the power mode aware module 132(1) operates with other suitable modules of the web browser 131(1) to prepare for pausing at the determined point. Further, the power mode aware module 132(1) sends back a pausing accepted signal to inform the power management module 121 that the web browser 131(1) is ready for powering off the CPU 112.

The power mode aware module 132(2) operates differently when the pausing request is triggered by the relatively long idle time of the input devices. In an example, when the user is watching a movie played by the video player 131(2), the user may not provide any input to the electronic system 100 for a relatively long time, thus the input devices may have the relatively long idle time. In this case, the power mode aware module 132(2) sends back a pausing denied signal to inform the power management module 121 that the video player 131(2) denies powering off the CPU 112.

During operation, the power management module 121 bridges between the applications 131(1-2) and the hardware layer 110 to determine suitable power mode based on the applications 131(1-2), and the hardware layer 110. Thus, in an example, when the CPU 112 is running, the power mode aware modules 132(1-2) are aware that the applications 131 (1-2) are able to pause without affecting user experience. The power management module 121 collects information from both the applications 131(1-2) and the hardware layer 110. Then, based on the collected information, the power management module 121 determines and configures the hardware layer 110 into the e-book mode to save power.

The electronic system 100 operates differently in response to different triggers. During operation, in an example, the user control power mode switch program 135 generates a trigger signal in response to a user instruction to switch the electronic system 100 into the e-book mode. The user control power mode switch program 135 sends the trigger signal to the power management module 121. The power management module 121 generates pausing request signals in response to the trigger signal, and suitably includes trigger information in the pausing request signals. Then, the power management module 121 sends the pausing request signals to the relevant applications 131(1-2), such as a web browser 131(1), a video player 131(2), and the like, in the application layer 130.

Because the pausing request signals are triggered in response to the user instruction, the web browser 131(1) and the video player 131(2) accept the pausing requests, and prepare for pausing. Specifically, the web browser 131(1) determines pausing points for dynamic contents. For example, the web browser 131(1) determines an image for a flash commercial to pause at, and prepares for pausing at the image. Then, the web browser 131(1) sends a pausing accepted signal to the power management module 121. The video player 131(2) determines a video image to pause at, and prepares for pausing at the video image. Then, the video player 131(2) sends a pausing accepted signal to the power management module 121.

When the power management module 121 receives the pausing accepted signals, the power management module 121 sends a switch signal to the power management unit 111 in the hardware layer 110 to switch the hardware layer 110 into the e-book mode. It is noted that, in an embodiment, the applications 131(1-2) are configured to send pausing denied signals when the pausing request is denied. Thus, the power management module 121 determines that the applications 131(1-2) accept the pausing request when the power management module 121 does not receive any pausing denied signals.

In another example, the idle profiler 125 generates a trigger signal in response to a relatively long input idle time. The power management module 121 generates pausing request signals in response to the trigger signal, and includes the trigger information in the pausing request signals. Then, the power management module 121 sends the pausing request signals to the relevant web browser 131(1), the video player 131(2), and the like, in the application layer 130.

Because the pausing request signals are generated in response to the relatively long input idle time, the web browser 131(1) and the video player 131(2) respond to the pausing request signals based on their respective states. Specifically, the web browser 131(1) determines whether pausing is allowable based on current web contents. In an example, when the current web contents include a flash commercial and static texts, the web browser 131(1) determines that pausing is allowable. Further, the web browser 131(1) determines an image for the flash commercial to pause at, and prepares for pausing at the image. Then, the web browser 131(1) sends a pausing accepted signal to the power management module 121. It is noted that, in an example, when the web browser 131(1) accepts the pausing request, the web browser 131(1) does not need to send any signals back to the power management module 121. The power management module 121 determines that the web browser 131(1) accepts the pausing request by default.

Similarly, the video player 131(2) determines whether pausing is allowable based on its status. When the video player 131(2) is actively playing a video, the video player 131(2) determines that pausing due to relatively long input idle time is not appropriate, and sends a pausing denied signal to the power management module 121. When the power management module 121 receives the pausing denied signal, the power management module 121 cancels the power mode switching.

When the video player 131(2) is not playing, for example, when the video player 131(2) is in a setup state in which a user is setting up a preferred playing mode, or when the video player 131(2) is already in a pausing status, the video player 131(2) accepts the pausing request. Thus, no pausing denied signal is sent. In an example, the video player 131(2) sends pausing accepted signal to the power management module 121. Then, the power management module 121 triggers the power management unit 111 to switch the hardware layer 110 into the e-book mode.

By comparison, an electronic system (not shown) that is not configured as described herein, enters the e-book mode when a CPU idle time is longer than a threshold. Then, when a web browser application includes dynamic contents, such as an animation, a flash commercial, and the like, that require CPU processing, the CPU idle time may keep shorter than the threshold. Then, the comparison electronic system stays in the active mode, and consumes a lot of power even though the user is not actively using the comparison electronic system.

Figure 2:
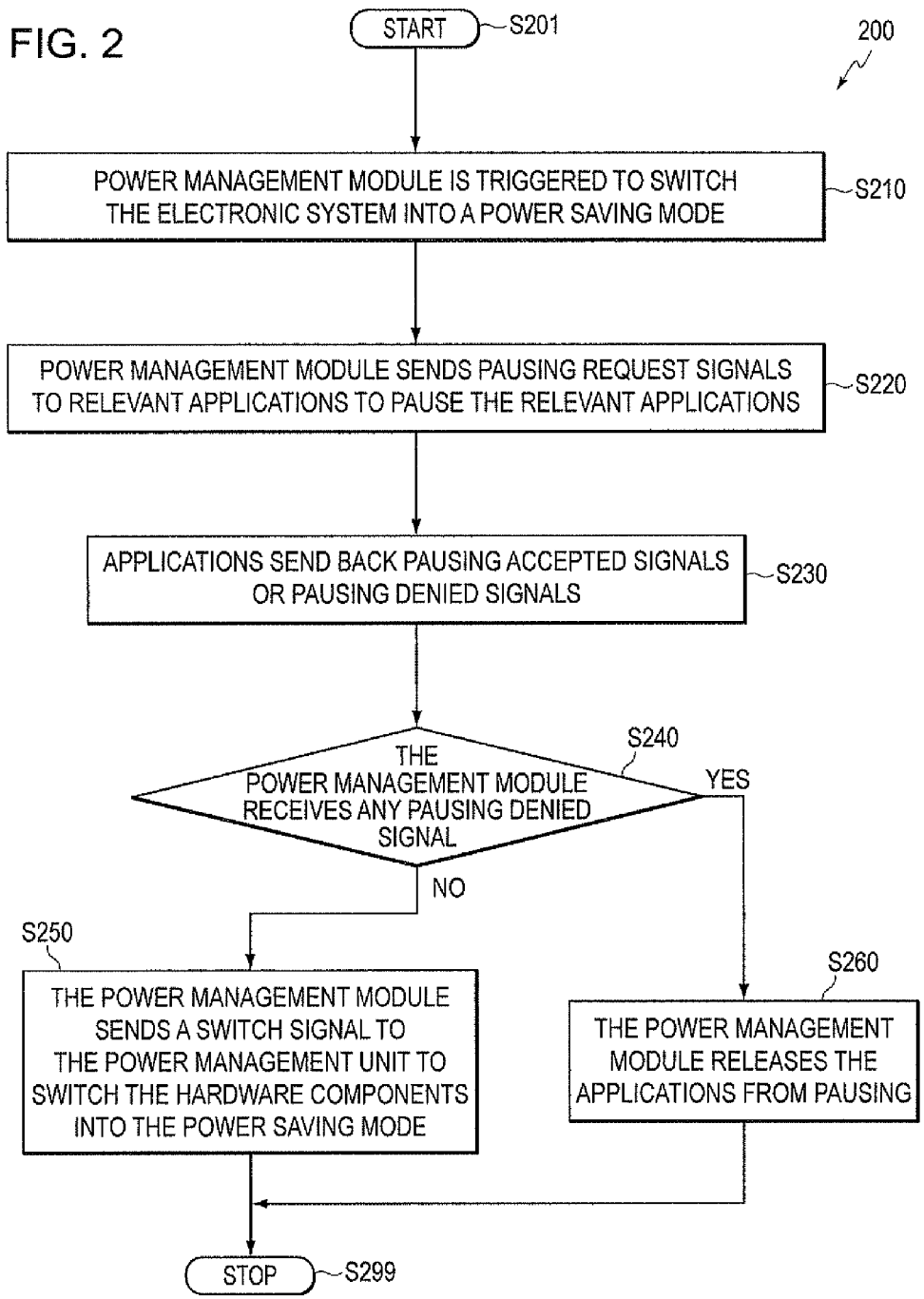
FIG. 2 shows a flow chart outlining a process example 200 for an electronic system to enter a power saving mode according to an embodiment of the disclosure.

FIG. 2 shows a flow chart outlining a process example 200 for the electronic system 100 to enter a power saving mode according to an embodiment of the disclosure. The process starts at S201 and proceeds to S210.

At S210, the power management module 121 in the kernel layer 120 is triggered to switch the electronic system 100 into a power saving mode, such as the e-book mode. In an example, the user control power mode switch program 135 receives a user instruction, and sends a trigger signal in response to the user instruction. In another example, the idle profiler 125 detects that an input device idle time is longer than an input device idle threshold, and triggers the power management module 121. In another example, the idle profiler 125 detects that a CPU idle time is longer than a CPU idle threshold, and triggers the power management module 121.

At S220 the power management module 121 sends pausing request signals to relevant applications, such as a running web browser 131(1) and a running video player 131(2), to pause the relevant applications. It is noted that, in an embodiment, the pausing request signals carry suitable information, such as types of triggers, types of power saving mode, and the like. For example, the pausing request signals indicate that the power mode switch is triggered due to a relatively long input idle time, and the intended power saving mode is the e-book mode. In another example, the pausing request signals indicate that the power mode switch is triggered due to a user instruction, and the intended power saving mode is the e-book mode.

At S230, the relevant applications respectively send pausing accepted signals or pausing denied signals based on the pausing request signals and the relevant applications. When an application sends a pausing accepted signal, the application also prepares to pause at a suitable point. In an example, the web browser 131(1) determines whether pausing dynamic contents is appropriate, further determines suitable pausing points for the dynamic contents, and then prepares for pausing at the determined pausing points. In an example, the web browser 131(1) determines an image for a flash commercial to pause at, prepares to pause at the determined image, and sends a pausing accepted signal in response to a pausing request signal. In another example, the video player 131(2) determines a video image to pause at, prepares to pause at the determined video image, and sends a pausing accepted signal when the pausing request signal is triggered by a user instruction. In another example, the video player 131(2) sends a pausing accepted signal when the video player 131(2) is already at a pausing status. In another example, the video player 131(2) sends a pausing denied signal when the pausing request signal is triggered by a relatively long input idle time.

At S240, the power management module 121 determines whether any pausing denied signal has been received. A pausing denied signal indicates that an application denies the pausing request. Based on the received signals, the power management module 121 determines whether the relevant applications accept or deny the pausing request. When the power management module 121 does not receive any pausing denied signal, or in another embodiment, the power management module 121 receives pausing accepted signals from all the relevant applications, the process proceeds to S250; otherwise, the process proceeds to S260.

At S250, the power management module 121 sends a switch signal to the power management unit 111 to suitably switch the hardware components of the electronic system 100 into the power saving mode. Then, the process proceeds to S299 and terminates.

At S260, the power management module 121 releases the relevant applications from pausing. Then, the process proceeds to S299 and terminates.

It is noted that the process 200 can be suitably modified. In an example, the step S260 is not necessary, for example, the relevant applications automatically self-release from pausing after a timer expires.

Figure 3:
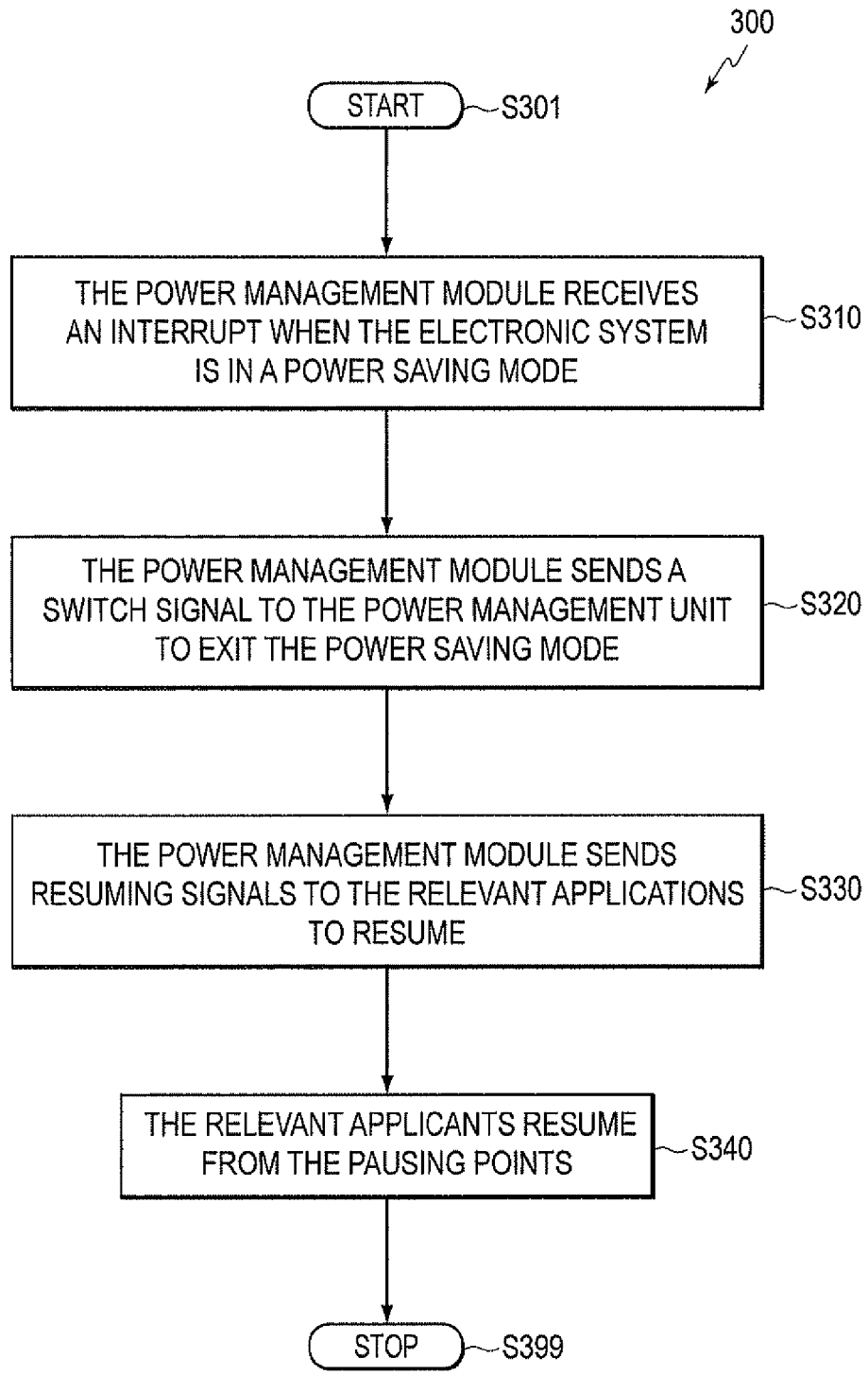
FIG. 3 shows a flow chart outlining a process example 300 for an electronic system to exit a power saving mode according to an embodiment of the disclosure.

FIG. 3 shows a flow chart outlining a process example 300 for the electronic system 100 to exit a power saving mode according to an embodiment of the disclosure.

At S310, the power management module 121 receives an interrupt when the electronic system 100 is in a power saving mode, such as an e-book mode. In an example, the electronic system 100 enters the e-book mode when the user takes a coffee break. When the user is back and presses any key on the keypad of the electronic system 100, the I/O devices 114 generate an interrupt, and the interrupt triggers the power management module 121.

At S320, the power management module 121 sends a switch signal to the power management unit 111 to control the hardware components of the electronic system 100 to exit the power saving mode, and enter the active mode.

At S330, the power management module 121 sends resuming signals to the relevant applications.

At S340, the relevant applications resume running from the respective pausing points in response to the resuming signals. The process then proceeds to S399 and terminates.

While the invention has been described in conjunction with the specific embodiments thereof that are proposed as examples, it is evident that many alternatives, modifications, and variations will be apparent to those skilled in the art. Accordingly, embodiments of the invention as set forth herein are intended to be illustrative, not limiting. There are changes that may be made without departing from the scope of the invention.

What is claimed is:

1. A method for power mode switching, comprising:
    sending a pausing request to an application executed in an electronic system, the pausing request being configured to inform the application of an intent to switch the electronic system from an active mode to a power saving mode that causes the electronic system to pause executing the application;
    accessing the application for the application type and the current status of the application;
    determining a trigger type that triggers the pausing request
    determining that the application accepts the pausing request based on the application type, the trigger type and the current status of the application;
    and
    configuring the electronic system into the power saving mode when the application accepts the pausing request, such that the application pauses at a pausing point that is determined in response to the pausing request.

2. The method of claim 1, further comprising:
    receiving an idle trigger for switching to the power saving mode when an idle time of the electronic system is longer than a threshold; and
    sending the pausing request in response to the idle trigger.

3. The method of claim 2, further comprising at least one of:
    receiving an input idle trigger when an input idle time is longer than an input idle threshold; and
    receiving a central processing unit (CPU) idle trigger when a CPU idle time is longer than a CPU idle threshold.

4. The method of claim 1, further comprising:
    receiving a user trigger for switching to the power saving mode in response to a user request; and
    sending the pausing request in response to the user trigger.

5. The method of claim 1, wherein determining that the application accepts the pausing request further comprises at least one of:
    receiving a pausing accepted signal from the application that indicates that the application accepts the pausing request; and
    not receiving a pausing denied signal from the application that indicates that the application denies the pausing request.

6. The method of claim 1, wherein configuring the electronic system into the power saving mode when the application accepts the pausing request further comprises:
    transmitting a switch signal to a power management unit that configures the electronic system into the power saving mode.

7. The method of claim 1, further comprising:
    receiving an interrupt from an input device when the electronic system is in the power saving mode;
    switching the electronic system to the active mode; and
    sending a resuming request to the application to resume execution from the pausing point.

8. An electronic system, comprising:
    hardware components configured to execute an application in an active mode and to pause execution of the application in a power saving mode;
    a power mode aware application configured to receive a pausing request that informs an intent to change to the power saving mode,
    access the application for the application type and the current status of the application;
    determine a trigger type that triggers the pausing request
    accept or deny the pausing request based on the application type, the trigger type and the current status of the application, and determine a pausing point and prepare to pause at the pausing point when the pausing request is accepted;
    and
    a power management module configured to send the pausing request to the power mode aware application during an execution of the power mode aware application, determine that the power mode aware application accepts the pausing request, and configure the hardware components to the power saving mode when the power mode aware application accepts the pausing request.

9. The electronic system of claim 8, wherein the power management module comprises:
an idle profiler configured to generate a first idle trigger to trigger the pausing request when an input idle time is longer than an input idle threshold, and to generate a second idle trigger to trigger the pausing request when a central processing unit (CPU) idle time is longer than a CPU idle threshold.

10. The electronic system of claim 8, further comprising:
a user power mode switch program configured to trigger the pausing request in response to a user request.

11. The electronic system of claim 8, wherein the power mode aware application is configured to send a pausing accepted signal to the power management module when the pausing request is accepted, or not to send a pausing denied signal to the power management module when the pausing request is accepted.

12. The electronic system of claim 8, wherein the hardware components further comprise:
a power management unit configured to switch the hardware components into the active mode or into the power saving mode based on a switch signal from the power management module.

13. The electronic system of claim 8, wherein the power management module is further configured to receive an interrupt from an input device when the hardware components are in the power saving mode, switch the hardware components into the active mode, and send a resuming request signal to the power mode aware application to resume execution from the pausing point.

14. A non-transitory computer readable medium storing program instructions for causing a processor in an electronic system to execute operations for power management, the operations comprising:
sending a pausing request to an application during execution of the application, the pausing request being configured to inform the application of an intent to switch the electronic system from an active mode to a power saving mode that causes the electronic system to pause executing the application;
accessing the application for the application type and the current status of the application;
determining a trigger type that triggers the pausing request
determining that the application accepts the pausing request based on the application type, the trigger type and the current status of the application;
and
configuring the electronic system into the power saving mode when the application accepts the pausing request, such that the application pauses at a pausing point determined in response to the pausing request.

15. The non-transitory computer readable medium of claim 14, the operations further comprising:
receiving an idle trigger for switching to the power saving mode when an idle time of the electronic system is longer than a threshold; and
sending the pausing request in response to the idle trigger.

16. The non-transitory computer readable medium of claim 15, the operations further comprising at least one of:
receiving an input idle trigger when an input idle time is longer than an input idle threshold; and
receiving a processor idle trigger when a processor idle time is longer than a processor idle threshold.

17. The non-transitory computer readable medium of claim 14, the operations further comprising:
receiving a user trigger for switching to the power saving mode in response to a user request; and
sending the pausing request in response to the user trigger.

18. The non-transitory computer readable medium of claim 14, the operations further comprising at least one of:
receiving a pausing accepted signal from the application that indicates that the application accepts the pausing request; and
not receiving a pausing denied signal from the application that indicates that the application denies the pausing request.

19. The non-transitory computer readable medium of claim 14, the operations further comprising:
transmitting a switch signal to a power management unit that configures the electronic system into the power saving mode.

20. The non-transitory computer readable medium of claim 14, the operations further comprising:
receiving an interrupt from an input device when the electronic system is in the power saving mode;
switching the electronic system to the active mode; and
sending a resuming request to the application to resume execution from the pausing point.

* * * * *